United States Patent
Triller

(10) Patent No.: US 8,771,116 B2
(45) Date of Patent: *Jul. 8, 2014

(54) VEHICLE TRANSMISSION HAVING CONTINUOUSLY VARIABLE GEAR RATIOS

(75) Inventor: Andreas Triller, Bühl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 722 days.

This patent is subject to a terminal disclaimer.

(21) Appl. No.: 12/737,211

(22) PCT Filed: May 28, 2009

(86) PCT No.: PCT/DE2009/000762
§ 371 (c)(1),
(2), (4) Date: Mar. 14, 2011

(87) PCT Pub. No.: WO2009/152794
PCT Pub. Date: Dec. 23, 2009

(65) Prior Publication Data
US 2011/0160012 A1      Jun. 30, 2011

Related U.S. Application Data

(60) Provisional application No. 61/132,425, filed on Jun. 17, 2008.

(51) Int. Cl.
*F16H 37/02* (2006.01)

(52) U.S. Cl.
USPC ............................................. 474/72

(58) Field of Classification Search
USPC .................... 474/8, 69, 72; 475/210
See application file for complete search history.

(56) References Cited

U.S. PATENT DOCUMENTS

| | | | | |
|---|---|---|---|---|
| 2,621,545 A | * | 12/1952 | Karig | 74/745 |
| 4,136,581 A | * | 1/1979 | Winter et al. | 475/210 |
| 4,458,558 A | * | 7/1984 | Frank | 74/665 GE |
| 4,539,866 A | * | 9/1985 | Koivunen | 475/210 |
| 4,589,303 A | * | 5/1986 | Roberts | 475/211 |
| 4,630,504 A | * | 12/1986 | Smirl | 474/8 |
| 4,660,438 A | * | 4/1987 | Tatara et al. | 477/41 |
| 4,740,191 A | * | 4/1988 | Takano et al. | 474/69 |
| 5,031,481 A | * | 7/1991 | Algrain et al. | 477/45 |
| 5,468,192 A | * | 11/1995 | Robbins | 474/28 |

(Continued)

FOREIGN PATENT DOCUMENTS

DE        4234629 A1 *  4/1993   ............. B60K 17/08

*Primary Examiner* — William A Rivera
*Assistant Examiner* — Michael Riegelman
(74) *Attorney, Agent, or Firm* — Alfred J. Mangels

(57) ABSTRACT

A vehicle transmission having continuously variable transmission ratios including an input shaft and an intermediate shaft. A first conical disk pair is disposed on a first shaft and a second conical disk pair is disposed on a second shaft. A belt connects the disk pairs. An intermediate gear that can be rotatably engaged with the first shaft, and an output gear, are rotatably supported on the intermediate shaft. A connecting gear is non-rotatably disposed on the intermediate shaft. A first force transmitting device is disposed between the input shaft and intermediate shaft, a second force transmitting device is disposed between the input shaft and the intermediate gear, a third force transmitting device is disposed between the intermediate gear and output gear, and a fourth force transmitting device is disposed between the intermediate shaft and the output gear. At least one of the force transmitting devices is a freewheel.

6 Claims, 4 Drawing Sheets

(56) References Cited

U.S. PATENT DOCUMENTS

| | | | |
|---|---|---|---|
| 6,997,831 B2* | 2/2006 | Kanda et al. | 474/8 |
| 7,815,537 B2* | 10/2010 | Triller et al. | 475/210 |
| 7,824,295 B2* | 11/2010 | Triller et al. | 475/210 |
| 8,123,646 B2* | 2/2012 | Triller | 475/211 |
| 8,235,848 B2* | 8/2012 | Triller | 474/8 |
| 2009/0017957 A1* | 1/2009 | Triller et al. | 475/207 |
| 2009/0017959 A1* | 1/2009 | Triller | 475/210 |
| 2011/0160012 A1* | 6/2011 | Triller | 474/72 |
| 2011/0244998 A1* | 10/2011 | Triller | 474/8 |

* cited by examiner

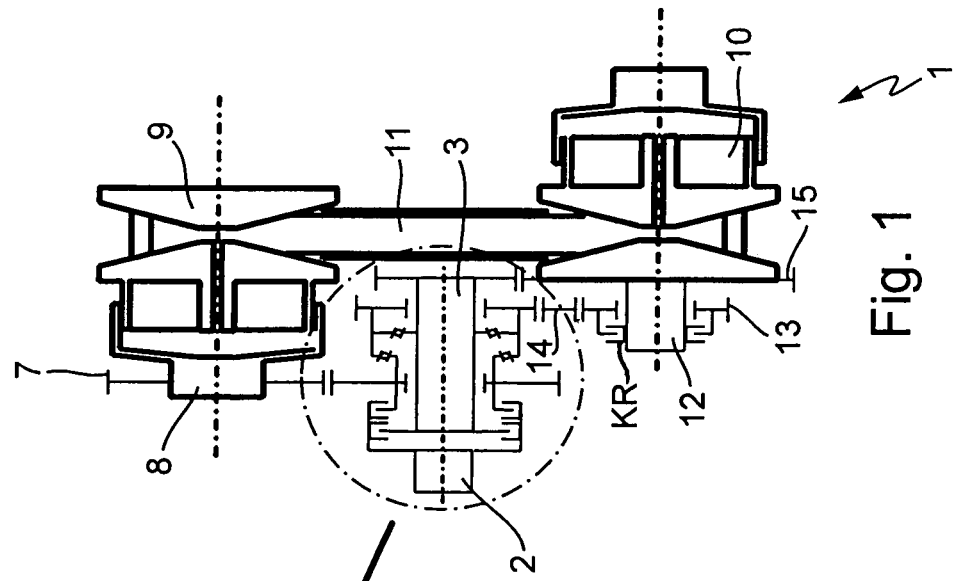
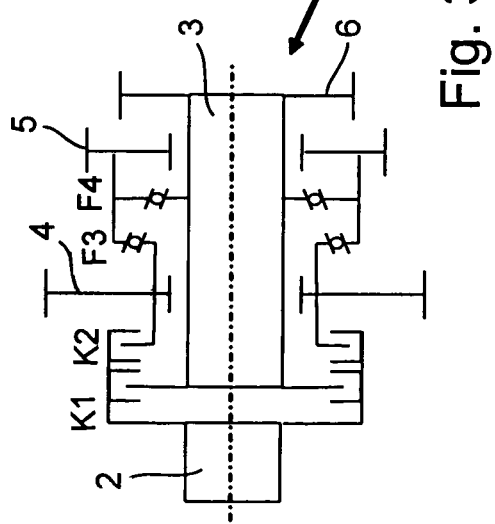
Fig. 1
Fig. 3
Fig. 2

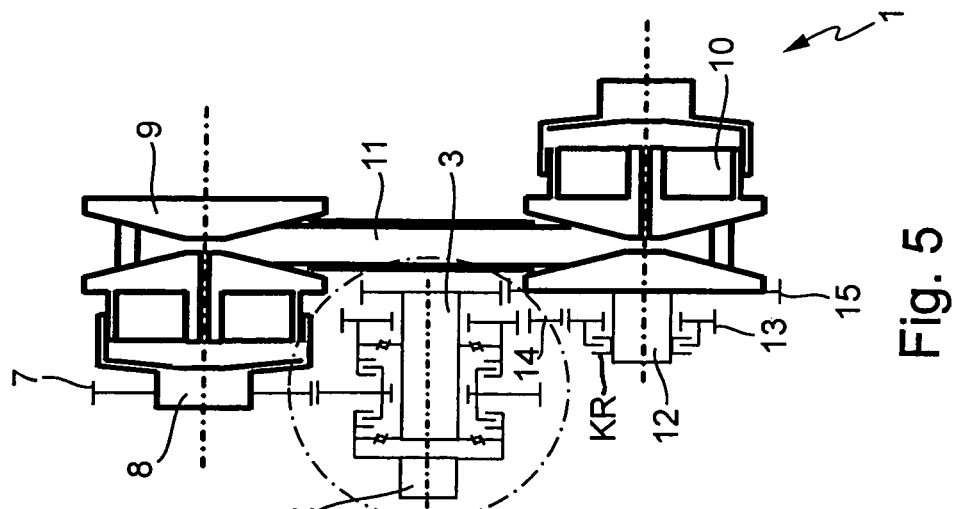
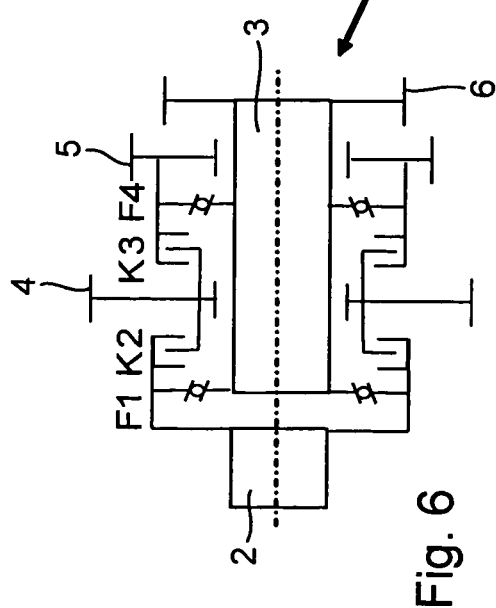
Fig. 5
Fig. 6
Fig. 7

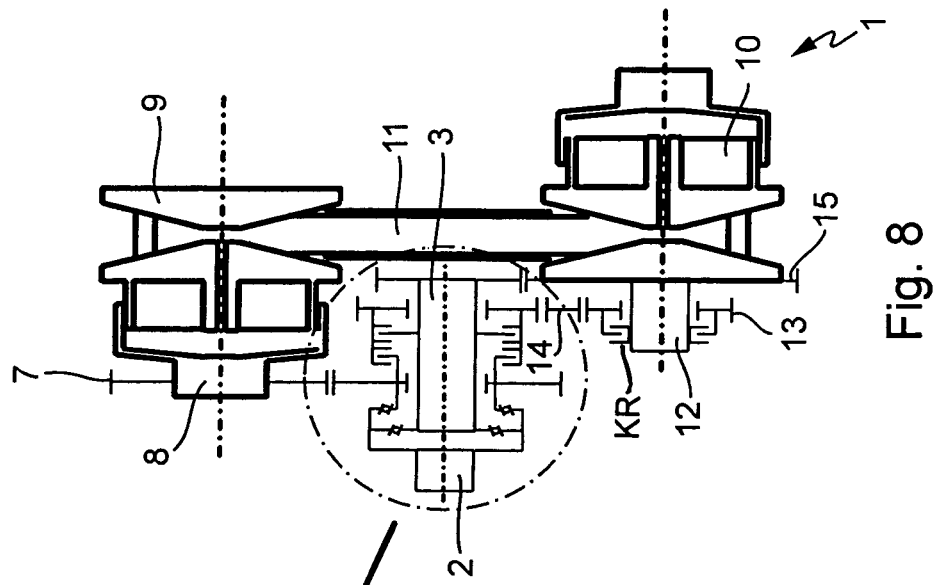
Fig. 8
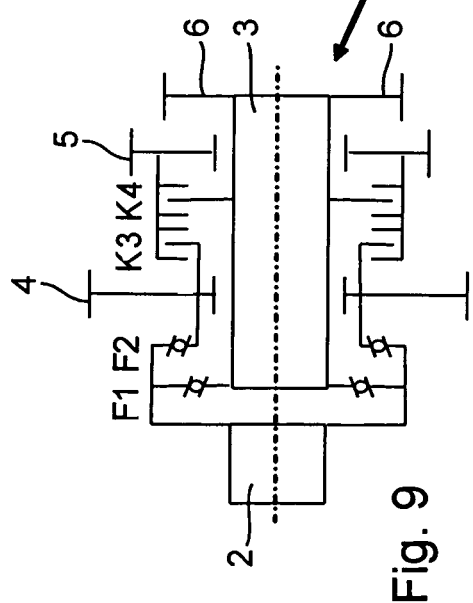
Fig. 9
| | $K_R$ | $F_1$ | $K_4$ | $F_2$ | $K_3$ |
|---|---|---|---|---|---|
| R | X | Ü | - | - | - |
| N | - | - | - | - | - |
| Low | - | Ü | X | S | - |
| High | - | S | - | Ü | X |
Fig. 10

VEHICLE TRANSMISSION HAVING CONTINUOUSLY VARIABLE GEAR RATIOS

BACKGROUND OF THE INVENTION

The present invention relates to a vehicle transmission having continuously variable transmission ratios, with a first conical disk pair disposed on a first shaft and a second conical disk pair disposed on a second shaft. A a belt means is disposed between the conical disk pairs, as well as an input shaft and an intermediate shaft. On the intermediate shaft an intermediate gear that can be brought in into rotational engagement with the input shaft and an output gear are rotatably supported and a connecting gear is disposed non-rotatably. Between the input shaft and the intermediate shaft a first torque transmission device is disposed, and between the input shaft and the intermediate gear a second torque transmission device is disposed. Between the intermediate gear and the output gear a third torque transmission device is disposed, and between the intermediate shaft and the output gear a fourth torque transmission device is disposed.

Based on the yet unpublished U.S. patent application 60/999,964 filed by the applicant, a generically relevant vehicle transmission with continuously variable gear ratio has been disclosed.

The transmission relates to a so-called $i^2$-red-transmission, whereby "i" refers to the transmission ratio of a conical disk-belt transmission variator and "2" indicates that the transmission range of the speed variator is repeated twice.

In that manner a transmission with a large total transmission ratio can be attained, which can transmit a high drive torque.

Although the above-described transmission has already proven itself, it features the disadvantage of entailing a relatively complex design because it features five clutches altogether, of which one clutch is assigned to the reverse driving range although four clutches are necessary for the conical disk belt transmission that is repeated twice for a large total ratio. Those clutches must be activated accordingly, which leads to complicated shifting processes.

An object of the present invention is to simplify the generic vehicle transmission with respect to its design and thus the control of individual torque transmitting components of the transmission.

SUMMARY OF THE INVENTION

The present invention provides a vehicle transmission having continuously variable transmission ratios, with a first conical disk pair disposed on a first shaft and a second conical disk pair disposed on a second shaft. A belt means is disposed between the conical disk pairs as well as an input shaft and an intermediate shaft, wherein on the intermediate shaft an intermediate gear wheel that can be brought into rotational engagement with the first shaft and an output gear are rotatably supported, and a connecting gear is disposed non-rotatably. Between the input shaft and the intermediate shaft a first torque transmission device is disposed, and between the input shaft and the intermediate gear wheel a second torque transmission device is disposed. Between the intermediate gear and the output gear a third torque transmission device is disposed, and between the intermediate shaft and the output gear a fourth torque transmission device is disposed, wherein at least one of the torque transmission devices is a freewheel.

That means, in other words, that according to the present invention at least one of the torque transmission devices no longer exists in the form of a clutch, but rather in the form of a freewheel. That also eliminates the necessity to have to control the omitted clutch. The arrangement of freewheel/freewheels is provided in that it blocks or engages in the desired torque transmission direction, and it can be overrun in the opposite direction without the blocking effect.

According to a preferred embodiment, the input shaft and the intermediate shaft are coaxial, and the torque transmission devices are controlled such that a "Low" driving range with a high transmission ratio and a lower transmission ratio "High" driving range arise, so that the vehicle transmission according to the invention has a large total transmission ratio.

According to a preferred embodiment in accordance with the present invention, the first and second torque transmission device is respectively a clutch, and the third as well as fourth torque transmission device is respectively a freewheel. Therefore, a transmission of torque between the input shaft and the intermediate shaft can occur by means of a switchable clutch. Likewise, torque transmission between the input shaft and intermediate gear can occur by means of a clutch, wherein this is respectively possible in both directions, whereas by means of freewheels between the intermediate gear and the output gear, or between the intermediate shaft and the output gear of disposed freewheels, torque transmission is possible respectively in only one direction of rotation.

Thus, in this embodiment, the possibility has been created, however, for omitting two of the four clutches otherwise required for passing through the total transmission ratio of the vehicle transmission according to the invention.

According to an alternative embodiment, it is also intended according to the present invention that the first and fourth torque transmission device be respectively a freewheel device, and the second and third torque transmission device be respectively a clutch. Therefore, torque transmission between the input shaft and the intermediate shaft is only possible in one direction, while also between the intermediate shaft and the output gear the torque transmission is possible only in one direction. Also in this embodiment, two clutches can be omitted amongst the four otherwise required clutches.

According to a further embodiment, it is possible that the first and second torque transmission device is respectively a freewheel, and the third and fourth torque transmission device is respectively a clutch. Also in this embodiment, relative to the well-known vehicle transmission, two of the clutches required for passing through the total transmission ratio have been omitted, such that also the means for controlling both clutches have been omitted and are no longer required. Therefore, the vehicle transmission according to the present invention has, compared with the above disclosed vehicle transmission, a simpler design, and it can be made more cost-effectively since control devices such as program controls for the omitted clutches are no longer required.

In all described embodiments, it is provided that on the second shaft a gear is supported rotatably, which can be brought into torque transmission engagement with the output gear by means of a clutch. Thus, a direction of rotation reversal can be achieved, which works similarly to a turning stage in order to enable reverse motion for the motor vehicle equipped with said transmission.

Finally, it is provided for torque feed into the intermediate shaft, starting from the second shaft, that the second shaft is connected non-rotatably with a gear that is in rotary connection with a connecting gear such that torque transmission is possible between the second shaft or the second conical disk pair and the intermediate shaft.

BRIEF DESCRIPTION OF THE DRAWINGS

The invention is illustrated as follows by means of the drawing, which features in:

FIG. 1 a principle representation of a vehicle transmission according to the present invention in a first embodiment;

FIG. 2 a matrix of positions of clutches and freewheels provided in the vehicle transmission according to FIG. 1;

FIG. 3 an enlarged representation of the input shaft design and the intermediate shaft with components disposed on it as encircled in FIG. 1;

FIG. 5 a principle representation of the vehicle transmission according to a second embodiment of the present invention;

FIG. 6 an enlarged representation of the input shaft design and the intermediate shaft with components disposed on it as encircled in FIG. 5;

FIG. 7 a matrix of positions of clutches and freewheels provided in the vehicle transmission according to FIG. 5;

FIG. 8 a principle representation of vehicle transmission according to a third embodiment of the present invention;

FIG. 9 an enlarged representation of the input shaft design and the intermediate shaft with components disposed on it as encircled in FIG. 8; and FIG. 10 a matrix of positions of clutches and freewheels provided in the vehicle transmission according to FIG. 8.

DESCRIPTION OF THE PREFERRED EMBODIMENTS

Figure 4C:
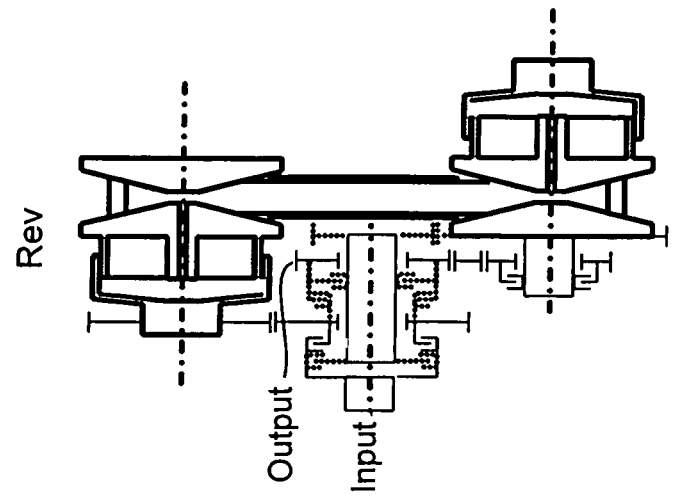
FIGS. 4a, 4b, and 4c representations of different driving ranges of the vehicle transmission according to the invention.

FIG. 1 of the drawings shows a principle representation of a vehicle transmission 1 in accordance with a first embodiment according to the present invention.

The vehicle transmission 1 features an input shaft 2, through which drive torque from an internal combustion engine (not represented) can be introduced into the vehicle transmission 1. On an intermediate shaft 3, an intermediate gear 4 and an output gear 5 are supported rotatably, which is visible in the detail shown in FIG. 3 that is based on the represented structure of the design of the encircled section according to FIG. 1. A connecting gear-6 is disposed non-rotatably on the intermediate shaft 3 and serves for the introduction of torque into the intermediate shaft 3. As more closely evident from FIG. 3, a clutch K1 is disposed on the input shaft 2 in order to enable torque transmission from the input shaft 2 into the intermediate shaft 3 when the clutch K1 is engaged. Though a second clutch K2, torque can be transmitted from the input shaft 2 to the intermediate gear-4.

The intermediate gear 4 is in rotary engagement with a gear 7 that is in engagement with a first shaft 8. A first conical disk pair 9 can be driven with the first shaft 8. On the first conical disk pair 9 and on a second conical disk pair 10, a belt means 11 in the form, for example, of a plate-link chain is disposed by means of which power transmission between both conical disk pairs takes place.

The second conical disk pair 10 is at the same time disposed on a second shaft 12, on which a gear 13 is disposed rotatably. Through a reverse clutch KR, the gear 13 can be connected non-rotatably with the second shaft 12 in order to enable a reverse motion of the motor vehicle equipped with the vehicle transmission 1 according to this invention, namely by torque transmission from the gear 13 to the output gear 5 by means of a gear 14 that is in rotary engagement with the gear 13 and with the output gear 5. On a disk of the second conical disk pair, a gear 15 is disposed, which is in rotary engagement with the connecting gear 6, such that torque transmission between the intermediate shaft 3 and the second conical disk pair 10 is possible.

FIG. 2 of the drawings shows a matrix of the positions of clutches and freewheels available in the vehicle transmission according to the invention shown in FIG. 1. "X" means that the clutch K1, K2, and KR is engaged. "U" means that the corresponding freewheel F3, F4 is overrun, or not engaged, and it therefore transmits no torque, and "S" means that the corresponding freewheel is engaged, and it therefore can transmit torque.

Figure 4B:
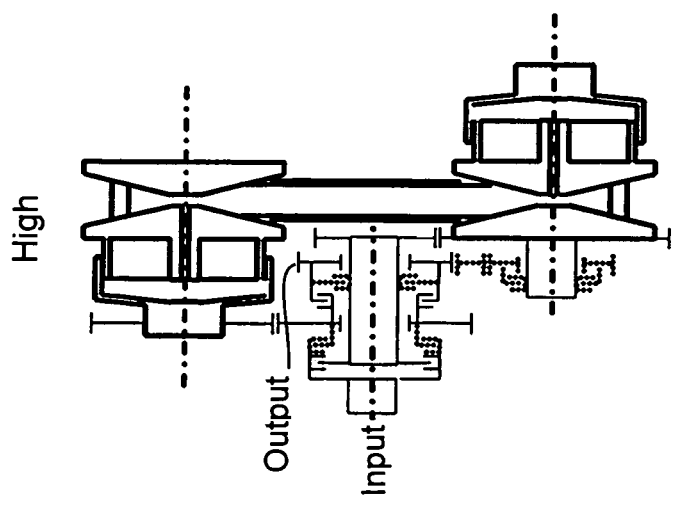
Figure 4A:
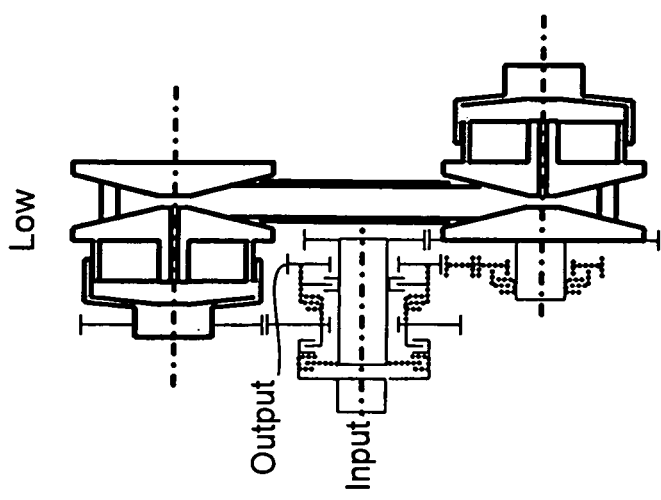

The accompanying driving ranges "Low", "High," and "Rev" are depicted in FIGS. 4a, 4b, and 4c of the drawings.

In the driving range "Low," which means a high transmission ratio position of the vehicle transmission according to the invention, in which the clutch K2 is engaged, thus closed, and therefore freewheel F4 transmits torque and freewheel F3 is overrun. The power flow in the vehicle transmission occurs from the input shaft 2, to the engaged clutch K2, to the intermediate gear 4, and to the gear 7 into the first shaft 8. From there, the torque is transmitted over the first conical disk pair 9 and the belt means 11 to the second conical disk pair 10, fed by the connecting gear 6 to the intermediate shaft 3, and from there it is fed by the engaged freewheel F4 to the output gear 5, from which it can be fed into the drive train of the vehicle—not represented.

Freewheel F4 is disposed between the intermediate shaft 3 and the output gear 5, freewheel F3 can transmit torque between the intermediate gear 4 and the gear 5.

In the driving range "High," the clutch K1 is engaged, freewheel F4 is overrun, and freewheel F3 is engaged. Torque transmission takes place at the same time from the input shaft 2 through the engaged clutch K1 to the intermediate shaft 3. From there the torque is transmitted by the connecting gear 6 to the second shaft 12, and transmitted by the second conical disk pair 10 and belt means 11 to the first conical disk pair 9, and from there by the first shaft 8 and the gear 7 to the intermediate gear 4, and is then transmitted by the engaged freewheel F3 to the output gear 5. From there the torque can be fed again into the drive train of the vehicle.

In the reverse driving range "Rev," torque transmission of the input shaft 2 takes place over the engaged clutch K2 to the intermediate gear 4 and to gear 7. From there the torque is fed by the gear 7 to the first shaft 8 and is transmitted by the first conical disk pair 9 and the belt means 11 to the second conical disk pair 10. Via the second shaft 12 and the engaged reverse driving clutch "KR," the torque is transmitted to the gear wheel 13 supported rotatably on the second shaft 12, which functions together with a further gear 14 that is in meshing engagement as a turning stage, and feeds torque to the output gear 5, by which reverse drive of the equipped vehicle is possible.

FIG. 5 of the drawings shows a vehicle transmission according to a second embodiment, in FIG. 6 the design and the arrangement of two clutches and two freewheels, and in FIG. 7 the representation of a matrix of the positions of the clutches and freewheels in different driving ranges of the vehicle transmission according to FIG. 5. As it is evident in this embodiment, freewheel F1 is disposed between the input shaft 2 and the intermediate shaft 3, and a further freewheel F4 between the intermediate shaft 3 and the output gear 5. A clutch K2 is disposed in the torque transmission path between the input shaft 2 and the intermediate gear 4.

In the matrix shown in FIG. 7, in the driving range "Rev," the reverse drive clutch "KR" is engaged, freewheel F1 is overrun just as freewheel F4 is overrun, and the clutch K2 is engaged. The torque path, or rather the torque transmission path, corresponds at the same time to the representation "Rev" in accordance with FIG. 4c of the drawings.

In the driving range "Low," freewheel F1 is overrun, freewheel F4 engaged, and the clutch K2 is engaged. The torque transmission path corresponds with the described driving range "Low" path based on FIG. 4a.

In the driving range "High," freewheel F1 is engaged, freewheel F4 is overrun, and the clutch K3 is engaged. The torque transmission path corresponds with the driving range "High" described under FIG. 4b.

FIG. 8 of the drawings shows a principle representation of a vehicle transmission according to the present invention in a third embodiment. In FIG. 9, the design and arrangement of two clutches and two freewheels is shown, and in FIG. 10 the representation of a matrix of the positions of the clutches and freewheels is shown in different driving ranges of the vehicle transmission according to FIG. 8.

In the transmission according to the third embodiment, freewheel F1 is disposed between the input shaft 2 and the intermediate shaft 3. Likewise, a freewheel F2 is disposed between the input shaft 2 and the intermediate gear 4. A clutch K3 is disposed in the torque transmission path between the intermediate gear 4 and the output gear 5, and a further clutch K4 is disposed between the intermediate shaft 3 and the output gear 5.

The formation of the part of the transmissions according to FIG. 5 and FIG. 8 required for the reverse movement of the vehicle corresponds with the arrangement of the corresponding part of the transmission according to FIG. 1.

If now the vehicle transmission according to FIG. 8 is shifted in the reverse drive ("Rev") position, then the reverse drive clutch KR will be engaged, freewheel F1 between the input shaft 2 and the intermediate shaft 3 will be overrun, and freewheel F2 between the input shaft 2 and the intermediate gear 4 is in the engaged position in which torque from the input shaft 2, with reference to the described torque transmission path in connection with FIG. 1, to the "Rev" position can be transmitted to the output gear 5.

In the high transmission ratio "Low" driving position, freewheel F1 is overrun, freewheel F2 is engaged and transmits torque to the intermediate gear-4, and from there the drive torque is fed over the input shaft, corresponding with the torque transmission path described based on the "Low" driving position in FIG. 4a, and transmits torque to the output gear 5.

In the driving range "High" with a low transmission ratio, freewheel F1 is in the engaged position, freewheel F2 is in the overrun position, and the clutch K3 is engaged, such that torque transmission from the input shaft 2 to the intermediate shaft 3 takes place, and from there in accordance with the torque transmission path corresponding with the "High" driving position to the output gear 5.

The vehicle transmission according to the invention allows one of the four clutches previously necessary for complete passage to total ratio of the disclosed vehicle transmission to be omitted; in the represented embodiments, respectively two clutches can be omitted. Thus, the design of the vehicle transmission was simplified relative to the design of the known vehicle transmission, and it is possible to design the actuation means for the vehicle transmission according to the invention in a simpler way than is the case with the known vehicle transmission, because the omitted clutches must no longer be actuated to respectively open and close. With this, the otherwise necessary actuators for the actuation of omitted clutches are eliminated.

With respect to the above features of the invention—not clarified in detail—reference is drawn expressly to the claims and the drawings.

What I claim is:

1. A vehicle transmission having continuously variable transmission ratios, said transmission comprising: a first conical disk pair disposed on a first shaft and a second conical disk pair disposed on a second shaft, a belt means disposed between and interconnecting the conical disk pairs, an input shaft and an intermediate shaft, wherein the input shaft and the intermediate shaft are coaxially arranged for rotation about respective coaxial axes of rotation, an intermediate gear is rotatably supported on the intermediate shaft and is engageable with a gear that is non-rotatably carried by the first shaft, an output gear is rotatably supported on the intermediate shaft and is axially spaced along the intermediate shaft from the intermediate gear, a connecting gear is non-rotatably disposed on the intermediate shaft, a first torque transmission device is disposed between the input shaft and the intermediate shaft, a second torque transmission device is disposed between the input shaft and the intermediate gear, a third torque transmission device is disposed between the intermediate gear and the output gear, and a fourth torque transmission device is disposed between the intermediate shaft and the output gear, wherein each of the torque transmission devices is disposed coaxially with the axis of rotation of the intermediate shaft, and wherein at least one of the torque transmission devices is a freewheel.

2. The vehicle transmission according to claim 1, wherein the first and the second torque transmission devices are clutches, and the third and fourth torque transmission devices are freewheels.

3. The vehicle transmission according to claim 1, wherein the first and fourth torque transmission devices are freewheels and the second and third torque transmission devices are clutches.

4. The vehicle transmission according to claim 1, wherein the first and second torque transmission devices are freewheels, and the third and fourth torque transmission devices are clutches.

5. The vehicle transmission according to claim 1, including a gear rotatably supported on the second shaft and operatively engageable with the output gear in torque transmission engagement by a reverse drive clutch.

6. The vehicle transmission according to claim 1, including a gear non-rotatably connected with the second shaft and in rotational engagement with the connecting gear.

* * * * *